W. A. HARRIS, DEC'D.
N. E. HOWARD, ADMINISTRATRIX.
VEHICLE SPRING WHEEL.
APPLICATION FILED MAR. 11, 1918.

1,366,450.

Patented Jan. 25, 1921.
2 SHEETS—SHEET 1.

Inventor
Walter A. Harris

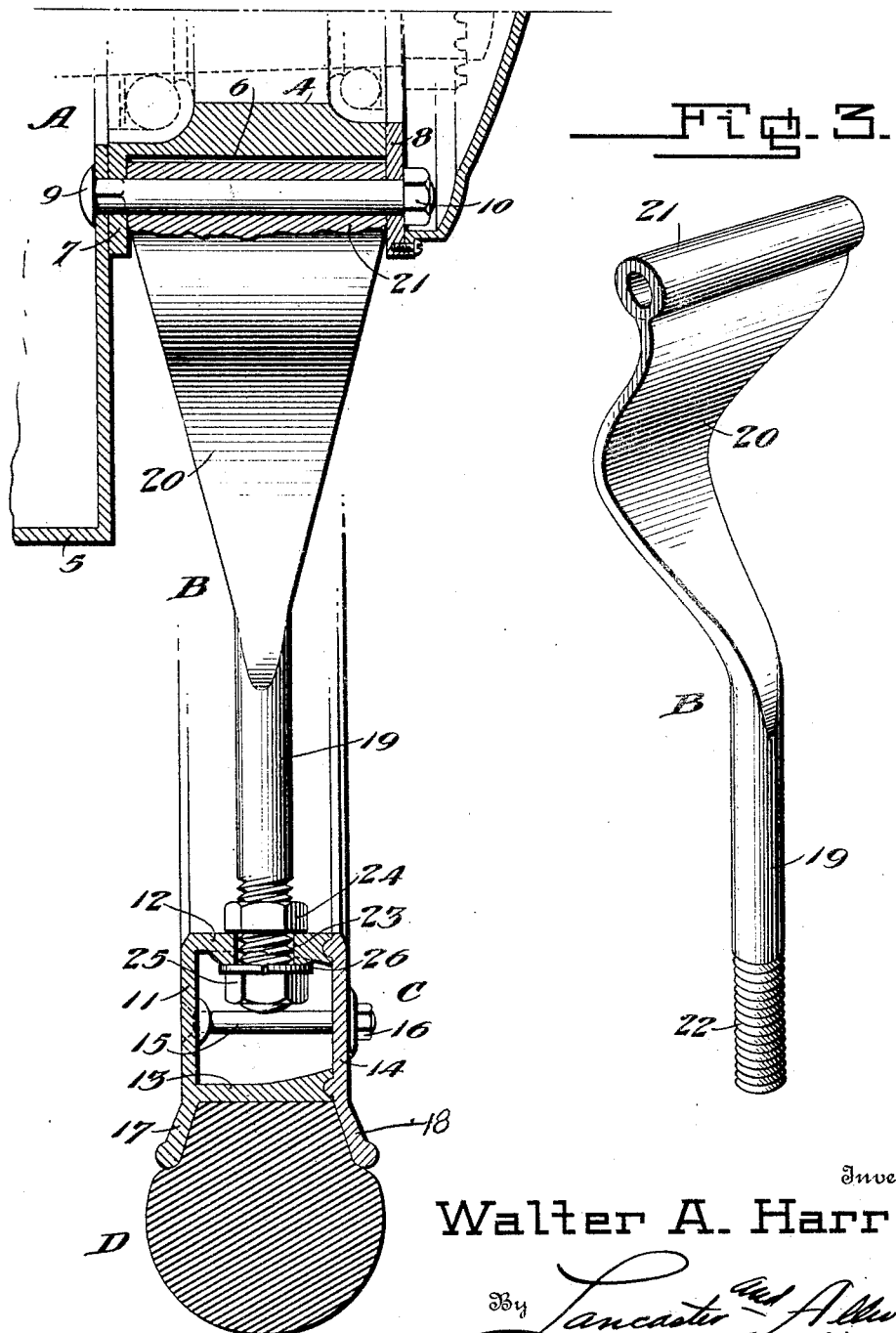

UNITED STATES PATENT OFFICE.

WALTER A. HARRIS, OF PALESTINE, TEXAS; NELLIE E. HOWARD, ADMINISTRATRIX OF SAID WALTER A. HARRIS, DECEASED, ASSIGNOR OF ONE-HALF TO JAMES H. DODD, OF PALESTINE, TEXAS.

VEHICLE SPRING-WHEEL.

1,366,450.  Specification of Letters Patent.  Patented Jan. 25, 1921.

Application filed March 11, 1918.  Serial No. 221,790.

*To all whom it may concern:*

Be it known that I, WALTER A. HARRIS, a citizen of the United States, and a resident of Palestine, in the county of Anderson and State of Texas, have invented a certain new and useful Improvement in Vehicle Spring-Wheels, of which the following is a specification.

My present invention relates to a spring wheel, and particularly to a wheel adapted for use upon automobiles or other vehicles and so constructed that within its own structure the wheel possesses sufficient resiliency to obviate the necessity for the use of a pneumatic or other cushion tire, except as such a tire might be applied to deaden the noise of traffic and to accommodate slight irregularities in the road surface.

An object of my invention is to provide a spring wheel which possesses a hard degree of resiliency due to the fact that the spring structure is embodied in the spokes, and which avoids the use of a double rim centered with coiled or bowed leaf springs therebetween, such as is now sometimes employed, thus giving a structure which is of very simple character and which can be readily repaired if perchance any part should become broken.

Yet another object lies in providing spokes of such form that they will flex to take up shocks of drive or power means when wheels having the spokes mounted therein are fitted as drive wheels, and which will guard against collapse or undue straining of the wheel structure through side strains such as might be encountered in turning corners or when the wheel skids.

A still further object lies in providing a wheel structure, which while within itself possessing sufficient resiliency to obviate the necessity for the use of a pneumatic or other cushion tire is nevertheless so constructed that solid rubber or like tire can be fitted thereto to deaden the noise of traffic and to compensate for slight irregularities in the road surface over which the wheel is traveling.

Further objects of my invention will appear in the following detailed description, taken in connection with the accompanying drawings, forming a part of this specification, and in which drawings:

Fig. 2 is a sectional view taken substantially on the line 2—2 of Fig. 1.

Fig. 3 is a perspective view to better disclose the construction of the spring spoke members.

In the drawings, where similar characters refer to similar parts throughout the views, A designates a hub which has the spokes B radiating therefrom and connected at their outer ends with a rim C, this rim having a solid rubber or other tire fitted thereto as indicated at D.

Figure 1:
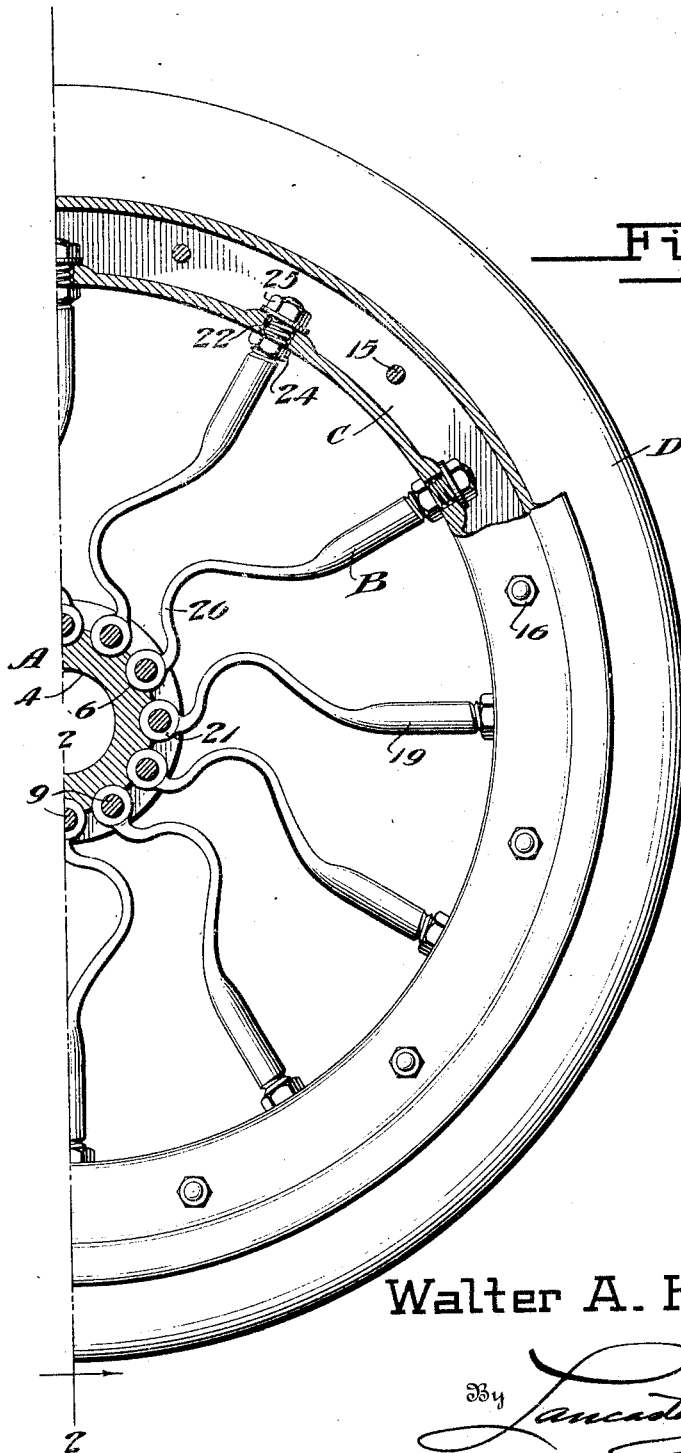
Figure 1 is a view partly in elevation and partly in section of a portion of a wheel constructed after the manner of my invention.

While the wheel might be constructed for use in a number of different connections, in the present disclosure I have illustrated a wheel structure of the character perhaps particularly for use upon a motor vehicle, and while the description will be naturally directed particularly to this form, it will be understood as the description progresses, that the parts will be substantially the same in any adaptations. The hub A has a central bore 4 for reception of an axle spindle, or in which a drive axle will be secured, and as is illustrated in Fig. 2, this hub structure might also be provided with ball races, and a brake drum might be fitted thereto as shown at 5. The hub A has a plurality of notched recesses 6 provided longitudinally thereof in its outer wall, and a flange 7 is upstanding at one side, a ring 8 being provided at the opposite side of the hub structure to correspond substantially with the flange. Both the flange 7 and the ring 8 have bolt receiving bores therethrough which are centered up substantially with the recesses 6 of the hub A, and bolts 9 are provided to be fitted through these registering openings and are held in place by nuts 10, which nuts also act to clamp the ring 8 in place to form substantially an integral part of the hub structure.

The rim C is made up of a side portion 11 which has the spaced flanges 12 and 13 extending therefrom, and a ring 14 is provided to be fitted to close over the opening between the flanges 12 and 13 and to correspond substantially with the side 11. Bolts 15 are provided to secure the ring 14 in place, nuts 16 being fitted to these bolts, and as the flanges 12 and 13 are grooved, as shown in Fig. 2, and the ring 14 has ribs on the inner sides thereof to be received in these grooves, when the nuts 16 are tightened in place the ring will be securely clamped against the free edges of the flanges 12 and 13 and will be positively locked against shifting. Outstanding tire engaging portions 17 and 18 are provided on the rim portion proper and on the ring 14, and as the ring 14 is to be secured in conjunction with the rim portion proper after the tire D has been fitted in place, it will be appreciated that this tire will be clamped upon the rim structure and will be held against shifting or against being torn loose from the wheel.

The spokes B each consist of a cylindrical portion 19, which gradually merges into a leaf portion 20, forming the resilient part of the spoke, and this leaf portion terminates in the bearing eye 21. The cylindrical portion 19 of each spoke is threaded as shown at 22, and while the leaf portion 20 connects with or merges into the eye 21 at a point substantially in line with the extent of the cylindrical portion 19, this leaf portion is bent and curved substantially after the manner shown in Figs. 1 and 3, so that as force is exerted endwise upon the cylindrical portion to move the same toward the bearing eye portion, this movement will be resiliently opposed by the curved leaf portion. The inner flange 12 of the rim C has spoke receiving openings 23 formed therethrough at spaced points, and the same number of spoke receiving openings are provided as there are bolts 9 mounted in the hub structure. It is perhaps desirable that the side 11 of the rim and the ring 14 be thickened out or reinforced where the bolts 15 hold in conjunction therewith, and that the flange 12 be also thickened to provide reinforcement around the spoke receiving openings 23, as it is at these points that the greatest strain will come in the use of the wheel.

In assembling the wheel structure, the bolts 15 will be removed so that the ring 14 can be taken from its fitted position with respect to the rim C, adjusting nuts 24 are fitted on the screw-threaded ends of the spokes B, and then the projecting ends of the spokes are placed through the spoke receiving openings 23, following which the clamp nuts 25 are fitted in place, lock washers 26 however being preferably first placed upon the threaded ends of the bolts so that when the clamp nuts 25 are tightened down, they will be positively locked and held against loosening while the wheel is in use. The ring 8 of the hub structure is now removed and the spokes are fitted with the bearing eyes 21 thereof in the notched-like recesses 6 of the inner hub portion proper so that the bearing openings of these eyes register with the openings of the flange 7 and the ring 8. The bolts 9 are now fitted to the registering openings and the nuts 10 are tightened in place to secure the ring 8 in a position to confine the bearing eyes 21 within the recesses 6, it however being understood that the bearing eyes have free turning movement upon the bolts 9. The spokes are now properly tightened by turning the adjusting nuts 24, and when this has been accomplished, the clamp nuts 25 will be tightened down to hold the adjustment and after the ring 14 has been again secured in place to secure and mount the tire upon the rim, the wheel is set up in completed form and is ready for use. The several spokes are fitted with the leaf portions 20 bent out in the same direction, substantially as shown in Fig. 1, and thus the entire wheel structure is made up essentially of a hub portion and a rim portion with a plurality of spokes connected therebetween and each is so arranged that it acts with the remaining spokes to take up and cushion shocks imparted to the rim.

While the leaf portions 20 of the various spokes are of such form, due to the widening out of the same, that there is very little likelihood of the spokes being broken, yet if perchance this should occur it is only necessary to remove the ring 8 and the ring 14, to then loosen the clamp nut 25, and remove the damaged spoke, after which a new spoke can be inserted in place in substantially the same manner and by the same procedure as is followed in the assembling of the completed wheel. Also, it will be appreciated that when the ring 14 is removed, the tire D can be taken from the rim, and that at the same time access may be had to the clamp nuts 25 to loosen the same and thus permit tightening or loosening of the spokes and the consequent variation in the resiliency thereof through manipulation of the adjusting nut 24.

Changes in details may be made without departing from the spirit or scope of my invention; but,

I claim:

1. In a spring wheel, the combination, of a hub provided with annular flanges upon its sides, a rim, a plurality of spring spokes connecting said rim and hub, each of said spokes being round adjacent said rim and being flat from substantially intermediate its ends toward said hub, said flat portion gradually increasing in width toward the hub and having its inner end of substantially equal width with the hub, a barrel formed upon the inner flattened end of each spoke, bolts extending through said hub flanges and said barrel, said flattened portions being sinuously curved, whereby the points of connection of the spokes with the hub and rim will be in radial alinement with the axis of the wheel.

2. In a spring wheel, the combination, of a hub, a rim, a plurality of spring spokes connecting said rim and hub, each of said spokes being round adjacent said rim and being flattened from substantially intermediate its ends toward said hub, said flattened portion gradually increasing in width toward the hub, said flattened portion being sinuously curved whereby the points of connection of the spokes with the hub and rim will be in radial alinement with the axis of the wheel.

WALTER A. HARRIS.